Patented July 23, 1946

2,404,607

UNITED STATES PATENT OFFICE 2,404,607

PRODUCTION OF ALKYLATION REAGENT AND ALKYLATION PROCESS

Preston L. Veltman, Fishkill, N. Y., and Lawrence W. Devaney, West Lafayette, Ind., assignors to The Texas Company, New York, N. Y., a corporation of Delaware No Drawing. Application May 2, 1942,
Serial No. 441,565

10 Claims. (Cl. 260—676)

This invention relates to a process of preparing reagents adapted for use in reactions designed to result in the introduction of an alkyl group into an organic compound. More particularly, the invention relates to a process of preparing a reaction product of isopropyl iodide and zinc and to a process in which this reaction product is reacted with an alkyl halide.

It is an object of the invention to provide a process for the preparation of a reaction product of a secondary or tertiary alkyl halide and zinc which may be employed as an alkylating agent. Another object of the invention is to provide a novel and efficient process for the production of a reaction product of isopropyl iodide and zinc. It is also an object of the invention to provide a process for synthesizing branched-chain hydrocarbons wherein an alkyl group, preferably a propyl group, is employed to replace the halogen in an alkyl halide. A more specific object of the invention is to provide a process for the preparation of 2,2,3-trimethyl butane (triptane).

Other objects of the invention will in part be obvious and will in part appear hereinafter.

The process of the invention comprises preparing valuable reaction products of zinc and secondary or tertiary alkyl halides by bringing an alkyl halide of this class into reactive contact with zinc in the presence of an inert solvent. As such halides there may be mentioned secondary or tertiary alkyl chlorides, bromides and iodides. These compounds, of course, contain at least three carbon atoms and it is contemplated that compounds containing, for example, six or more carbon atoms may be used. The process is especially important when applied to the preparation of a reaction product of isopropyl iodide and zinc, and the following description is concerned principally with the preparation and use of this product.

Although the reaction between isopropyl iodide and zinc, in the form of a zinc-copper couple, has been referred to as a possible reagent for organic synthesis, so far as known no satisfactory method for the preparation and use of this reaction product has been described. Reaction products of certain primary alkyl iodides with zinc may be prepared and recovered without difficulty, but if an attempt is made to use the same procedure which has been employed for the other reaction products for preparing the isopropyl iodide reaction product unsatisfactory results are obtained. For example, it is feasible to prepare reaction products of lower primary alkyl iodides with zinc by merely bringing the alkyl iodide into contact with a zinc-copper couple, refluxing, and eventually obtaining the desired product by distillation and condensation. If this procedure is followed in the preparation of the reaction product of isopropyl iodide with zinc, the product largely decomposes and little, if any, reaction product is recovered.

We have discovered that a reaction product of isopropyl iodide and zinc, which as brought out below is thought to be substantially entirely isopropyl zinc iodide, can be prepared without difficulty and in amounts corresponding to 75 to 85 per cent yield, based on the isopropyl iodide used, by bringing the isopropyl iodide and the zinc (preferably as a zinc-copper couple) into reactive contact in the presence of an inert solvent, particularly a non-aromatic hydrocarbon liquid. Thus, we have found that by adding isopropyl iodide to a zinc-copper couple in the presence of a paraffinic hydrocarbon liquid, such as commercial iso-octane, safety fuel, and normal heptane, the reaction between the isopropyl iodide and the zinc goes smoothly with relatively little decomposition or side reactions. There results from this reaction a solution containing isopropyl zinc iodide, and we have found that this solution is an excellent reagent for reaction with an alkyl halide, particularly tertiary alkyl chlorides and especially tertiary butyl chloride. It is not only not necessary to separate the reaction product from the solution, if indeed that can be done, but the solvent employed in forming the reaction product also constitutes an excellent reaction medium for the condensation reaction.

In carrying out the preparation of the reaction product between the isopropyl iodide and zinc, it is usually desirable to employ an excess of the zinc-copper couple, and at the end of the reaction, a mixture is obtained comprising the solution constituting the reagent and a sludge containing the unreacted metal and other products. It has been found that the reaction between the reagent and an alkyl halide such as tertiary butyl chloride can be carried out with especial efficiency in the presence of the sludge; apparently the sludge has a favorable effect upon the course of the alkylation step.

The process may be carried out by placing an excess of a zinc-copper couple in a suitable vessel. In this connection it is pointed out that the zinc-copper couple may be prepared in the conventional manner to contain about 6 to 10 per cent copper by heating a mixture of zinc dust and powdered cupric oxide in a stream of hydrogen.

It has been found, however, that turnings of zinc-copper alloys containing a large proportion of zinc and a small proportion of copper can be used in place of the zinc-copper couple prepared by the hydrogenation procedure. The use of the alloys introduces an important economic saving.

There is added to the vessel containing the zinc-copper couple a paraffinic hydrocarbon liquid in amount at least sufficient to produce a mixture which can be stirred. The isopropyl iodide is then added to the vessel slowly while preferably maintaining the temperature between about 50 and 75° C. It has been found that the reaction is best carried out in an inert atmosphere, such as an atmosphere of nitrogen, and that the reaction may be initiated by adding a little iodine or a lower alkyl iodide, such as methyl iodide. It is preferred to add the isopropyl iodide slowly at a rate such that the reaction is regular but over-reaction is avoided. The solution formed, containing iso-propyl zinc iodide, may be separated from the metallic sludge to obtain the completed reagent.

To synthesize branched-chain hydrocarbons a tertiary alkyl chloride may be mixed with this solution. For example, 2,2,3-trimethyl butane (triptane) can be prepared efficiently by reacting this solution with tertiary butyl chloride. It is preferred to carry out this step by adding the tertiary butyl chloride to the solution of isopropyl zinc iodide at a temperature in the neighborhood of 0° C. The tertiary butyl chloride may be in solution in an inert solvent, advantageously the same solvent as that employed in the preparation of the isopropyl zinc iodide. Although some reaction occurs by the reverse addition, the amount of desired product is reduced.

In order that the invention may be understood more fully reference should be had to the following examples in which are disclosed processes in accordance with the invention.

EXAMPLE 1

Part A 400 parts by weight of turnings from a zinc-copper alloy analyzing 89.2% zinc and 9.7% copper, with impurities of arsenic, iron and lead, was introduced into a reaction vessel which had previously been flushed with nitrogen, and which was fitted with a reflux condenser. Thereafter, about 69 parts by weight of normal heptane and a small crystal of iodine were added. About 26 parts by weight of isopropyl iodide were added and the mixture was stirred at about 60° C. until a reaction began. Isopropyl iodide was added at a substantially constant rate over an eight-hour period in an amount such that the total amount of isopropyl iodide used was about 850 parts by weight. After standing until reaction had ceased the solution was decanted through a glass wool filtering medium.

From tests made by hydrolyzing a portion of the solution and collecting and measuring the liberated gas it appeared that the solution contained isopropyl zinc iodide equal to a yield, based on the quantity of isopropyl iodide used, of about 76% of the theoretical. Analysis of hydrolyzed portions of the solution indicated that the ratio of propane:zinc:iodine was approximately 1:1:1, the zinc being somewhat low and the iodine being somewhat high. This was an indication that the reaction product between the isopropyl iodide and the zinc was mainly isopropyl zinc iodide and that little, if any, di-isopropyl zinc was present.

Part B

To 75 parts by volume of the isopropyl zinc iodide solution, prepared as described in Part A, a solution consisting of about 55 parts by volume of tertiary butyl chloride and 75 parts by volume of normal heptane were added over a three-hour period. The reaction mixture was held at about 0° C. for a total of about eight hours. Water was then added slowly, and the hydrocarbon layer which formed was separated, washed with sodium hydroxide solution, dried, and fractionally distilled. As a result of this distillation about 14 parts by volume of product were obtained which boiled in the range of 2,2,3-trimethyl butane (triptane).

EXAMPLE 2

In this example the solution of isopropyl zinc iodide prepared as described in Part A of Example 1 was employed and the procedure described in Part B of Example 1 was followed except that 75 parts by volume of normal heptane were added to the isopropyl zinc iodide solution before adding the solution of tertiary butyl chloride. Also, a quantity of the metallic sludge left from the preparation of the isopropyl zinc iodide was added to the reaction mixture at the beginning of the reaction. By fractional distillation 16 parts by volume of product boiling in the triptane range were obtained.

EXAMPLE 3

Part A

Turnings from a zinc-copper alloy, containing 7.6% copper, prepared by melting zinc sticks with pure brass turnings, were used in this example. 65 parts by weight of these turnings were introduced into a reaction vessel fitted with a reflux condenser and then 2,3-dimethyl butane was added as the solvent. To aid in initiating the reaction, about 20 parts by weight of methyl iodide were also added. To this mixture 42 parts by weight of isopropyl iodide were introduced at room temperature and the vessel was heated to 50 to 55° C. Then 43 parts by weight of isopropyl iodide were added slowly over about three hours while maintaining the temperature of the reaction vessel at 50 to 55° C.

Part B

While maintaining the temperature at about 0° C., to the reaction mixture obtained as described in Part A of this example, about 46 parts by weight of tertiary butyl chloride were added over a period of about nine hours. The product was allowed to stand for a period of about twelve hours at 0° C. Thereafter the product was washed with water and a sodium bicarbonate solution, dried, and distilled. 9.7 parts by weight of product boiling within the triptane range were obtained.

EXAMPLE 4

This example was carried out in a manner similar to that described in the previous examples, with the exception that a paraffinic petroleum liquid boiling within the range of about 150° to 200° C., was employed as the solvent. The specific liquid used was a liquid obtained as a result of sulfuric acid alkylation of olefins and iso-paraffins and known as "safety fuel." At the end of the reaction, the triptane was recovered by distillation in about 20 per cent yield, based on the isopropyl iodide.

When using a high boiling solvent (e. g. one having an initial boiling point of at least 150° C.)

in the preparation of a lower branched-chain hydrocarbon, the recovery of the latter hydrocarbon is simplified because it is possible to strip out the hydrocarbon without also vaporizing the solvent. Thus, the solvent can be recycled and used for additional reactions.

It will be understood that the foregoing examples are merely illustrative of the invention and that equivalent results may be obtained by similar processes within the general description given above. Thus, other inert solvents, particularly paraffinic hydrocarbon liquids, may be used in place of those specifically described. In the first step of the process in which the isopropyl zinc iodide is prepared, the reaction takes place very slowly, if at all, at room temperature and when the temperatures approach 100° C. the yields decrease rapidly. In general, therefore, it may be said that the reaction should be carried out at temperatures within the range of about 40° to 85° C. and, as noted above, it is preferred to operate within the range of about 50° to 75° C. with temperatures of about 65° C. being considered as optimum.

With respect to the amount of solvent to be used, tests have indicated that this is not a critical factor in the process. Sufficient solvent should be used to produce a mixture which can be stirred, but the use of an excess appears to have no adverse effect upon the reaction. The secondary or tertiary alkyl halide (e. g. isopropyl iodide) may be introduced in solution in the solvent and such practice in some cases will simplify handling of this compound. Although the solution of alkyl zinc halide constituting the reagent may be separated from the remainder of the mixture, this is not necessary since the reaction between this reagent and an alkyl halide can be carried out in the presence of the metallic sludge; e. g., in the reaction vessel in which the reagent was prepared.

In the foregoing examples the condensation of the isopropyl zinc iodide with tertiary butyl chloride has been specifically described. It will be understood that the invention is not restricted to condensations involving tertiary butyl chloride, but also includes condensations in which other alkyl halides capable of condensation with zinc alkyls or zinc alkyl halides are used. As examples of suitable alkyl halides there may be mentioned the various butyl, amyl, and hexyl chlorides, bromides, and iodides, especially the secondary and tertiary compounds, such as secondary butyl chloride or bromide, tertiary amyl chloride, and 2,3-dimethyl 2-chlorobutane.

In carrying out this condensation, approximately equi-molecular quantities of the isopropyl zinc iodide, or similar reaction product, and the alkyl halide may be used although it is usually advisable to employ a slight excess of the alkyl halide. As previously indicated, the optimum temperature for this condensation reaction is considered to be in the neighborhood of 0° C. for both functional and practical reasons. However, temperatures somewhat below this point and temperatures as high as 50° C. give reasonable yields of the desired branched-chain hydrocarbon, especially in cases where the other factors are favorable, such as adding the alkyl halide to the reagent solution. In recovering the desired product, the liquid phase may simply be separated from the reaction mixture by decanting or filtering, or the reaction mixture may be distilled. The liquid phase containing the desired branched-chain hydrocarbon when separated from the remainder of the reaction mixture may be used as such, but usually the mixture will be distilled to obtain a fraction relatively concentrated in the desired hydrocarbon.

Although the non-aromatic hydrocarbon liquids specifically disclosed are paraffinic in nature, and especial success has been had with these liquids, the naphthenic liquids are also considered as constituting desirable inert solvents of this preferred class.

Obviously many modifications and variations of the invention, as hereinbefore set forth, may be made without departing from the spirit and scope thereof, and therefore only such limitations should be imposed as are indicated in the appended claims.

We claim:

1. The process which comprises bringing an alkyl halide selected from the group consisting of secondary and tertiary alkyl halides into reactive contact with zinc in the presence of a saturated non-aromatic hydrocarbon liquid to form a solution in which a reaction product of the alkyl halide and zinc is dissolved in the hydrocarbon liquid, reacting said solution with an alkyl halide to cause condensation between said reaction product and said last-mentioned alkyl halide and form a branched-chain hydrocarbon, and recovering said branched-chain hydrocarbon.

2. The process which comprises bringing an alkyl iodide selected from the group consisting of secondary and tertiary alkyl iodides into reactive contact with a zinc-copper couple in the presence of a paraffinic hydrocarbon liquid to form a solution in which a reaction product of the alkyl iodide is dissolved in the paraffinic hydrocarbon liquid, reacting said solution with an alkyl halide to cause condensation between said reaction product and said alkyl halide and form a branched-chain hydrocarbon, and recovering said branched-chain hydrocarbon.

3. The process which comprises adding an alkyl iodide selected from the group consisting of secondary and tertiary alkyl iodides to a mixture comprising a finely-divided zinc-copper couple and a paraffinic hydrocarbon liquid and agitating the mixture, to form a solution in which an alkyl zinc iodide is dissolved in the paraffinic hydrocarbon liquid, reacting said solution with a tertiary alkyl halide to cause condensation between said alkyl zinc iodide and said tertiary alkyl halide and form a branched-chain hydrocarbon, and recovering said branched-chain hydrocarbon.

4. The process which comprises bringing isopropyl iodide into reactive contact with zinc in the presence of a paraffinic hydrocarbon liquid to form a solution in which isopropyl zinc iodide is dissolved in the hydrocarbon liquid, reacting said solution with an alkyl halide to cause condensation between said isopropyl zinc iodide and said alkyl halide and form a branched-chain hydrocarbon, and recovering said branched-chain hydrocarbon.

5. The process which comprises adding isopropyl iodide to a mixture comprising a finely-divided zinc-copper couple and a paraffinic hydrocarbon liquid maintained at a temperature within the range of about 40 to 85° C., to form a solution in which isopropyl zinc iodide is dissolved in the paraffinic hydrocarbon liquid, reacting said solution with a tertiary alkyl chloride to cause condensation between said isopropyl zinc iodide and said tertiary alkyl chloride and form a branched-chain hydrocarbon, and recovering said branched-chain hydrocarbon.

6. The process which comprises adding isopropyl iodide to a mixture comprising a finely-divided zinc-copper couple and a paraffinic hydrocarbon liquid to form a solution in which isopropyl zinc iodide is dissolved in the paraffinic hydrocarbon liquid, adding tertiary butyl chloride to said solution to cause condensation between said isopropyl zinc iodide and said tertiary butyl chloride and form a branched-chain hydrocarbon, and recovering said branched-chain hydrocarbon by distillation.

7. The process which comprises adding isopropyl iodide to a mixture comprising a finely-divided zinc-copper couple and a paraffinic hydrocarbon liquid maintained at a temperature within the range of about 40° to 85° C., to form a solution in which isopropyl zinc iodide is dissolved in the paraffinic hydrocarbon liquid, adding tertiary butyl chloride to said solution to cause condensation between said isopropyl zinc iodide and said tertiary butyl chloride and form a branched-chain hydrocarbon, subjecting the resulting mixture to hydrolysis and drying, and recovering said branched-chain hydrocarbon by distillation.

8. The process which comprises adding isopropyl iodide to a mixture comprising a finely-divided zinc-copper couple and a paraffinic hydrocarbon liquid maintained at a temperature within the range of about 40° to 85° C., said zinc-copper couple being present in an amount in excess of that theoretically required for reaction with said isopropyl iodide, to form a solution in which isopropyl zinc iodide is dissolved in the paraffinic hydrocarbon liquid in contact with a metallic sludge, reacting tertiary butyl chloride with said solution in the presence of said metallic sludge to cause condensation between said isopropyl zinc iodide and said tertiary butyl chloride and form a branched-chain hydrocarbon, and recovering said branched-chain hydrocarbon by distillation.

9. The process which comprises adding isopropyl iodide slowly to a mixture comprising a finely-divided zinc-copper couple and a paraffinic hydrocarbon liquid maintained at a temperature within the range of about 50° to 75° C. and agitating the mixture, to form a solution in which isopropyl zinc iodide is dissolved in the paraffinic hydrocarbon liquid, adding tertiary butyl chloride in solution in said paraffinic hydrocarbon liquid to said solution at a temperature in the neighborhood of 0° C. to cause condensation between said isopropyl zinc iodide and said tertiary butyl chloride and form a branched-chain hydrocarbon, and recovering said branched-chain hydrocarbon by distillation.

10. The process which comprises adding isopropyl iodide slowly to a mixture comprising a finely-divided zinc-copper couple and a paraffinic hydrocarbon liquid having an initial boiling point of at least 150° C., said mixture being maintained at a temperature within the range of about 40° to 85° C., to form a solution in which isopropyl zinc iodide is dissolved in the paraffinic hydrocarbon liquid, adding tertiary butyl chloride to said solution to cause condensation between said isopropyl zinc iodide and said tertiary butyl chloride and form a branched-chain hydrocarbon, and recovering said branched-chain hydrocarbon by distillation while avoiding substantial vaporization of said paraffinic hydrocarbon liquid.

PRESTON L. VELTMAN.
LAWRENCE W. DEVANEY.